(12) United States Patent
Hisel, Sr.

(10) Patent No.: US 10,959,417 B2
(45) Date of Patent: Mar. 30, 2021

(54) FISHING LINE GUIDE DEVICE

(71) Applicant: Steven Dale Hisel, Sr., Madison, WI (US)

(72) Inventor: Steven Dale Hisel, Sr., Madison, WI (US)

( * ) Notice: Subject to any disclaimer, the term of this patent is extended or adjusted under 35 U.S.C. 154(b) by 356 days.

(21) Appl. No.: 16/050,692

(22) Filed: Jul. 31, 2018

(65) Prior Publication Data

US 2020/0037592 A1 Feb. 6, 2020

(51) Int. Cl.
*A01K 91/06* (2006.01)
*A01K 91/08* (2006.01)

(52) U.S. Cl.
CPC .................................. *A01K 91/08* (2013.01)

(58) Field of Classification Search
CPC ...... A01K 91/053; A01K 97/00; A01K 97/14; A01K 97/24
See application file for complete search history.

(56) References Cited

U.S. PATENT DOCUMENTS

| | | | |
|---|---|---|---|
| 263,638 A | 8/1882 | Wentworth | |
| 3,618,147 A * | 11/1971 | Gaskill | B25F 1/02 7/106 |
| 3,942,737 A | 3/1976 | Luzi | |
| 3,961,437 A | 6/1976 | Lewis | |
| 4,586,286 A | 5/1986 | Cheatham | |
| 4,932,602 A | 6/1990 | Scott | |
| 5,588,243 A | 12/1996 | Caldwell | |
| 6,293,601 B1 * | 9/2001 | Johnson | A01K 97/14 294/175 |
| 2002/0121041 A1 * | 9/2002 | Haggerty | A01K 97/14 43/5 |
| 2004/0189028 A1 * | 9/2004 | Newman | H01J 9/003 294/210 |
| 2009/0170382 A1 * | 7/2009 | Cromartie | B63H 16/00 440/36 |

* cited by examiner

*Primary Examiner* — Richard G Davis

(57) ABSTRACT

A fishing line guide device for preventing snags and fish loss includes a rod and a cylinder. The cylinder is coupled to a bottom of the rod so that the cylinder is perpendicular to the rod. The rod is configured to be grasped in hands of a user, positioning the user to position the cylinder on a fishing line between a fishing pole and a hooked fish. The user is positioned to guide the line away from an obstruction as a fisherman reels in the line with the line sliding over the cylinder.

9 Claims, 4 Drawing Sheets

FISHING LINE GUIDE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to guide devices and more particularly pertains to a new guide device for preventing snags and fish loss.

BRIEF SUMMARY OF THE INVENTION

An embodiment of the disclosure meets the needs presented above by generally comprising a rod and a cylinder. The cylinder is coupled to a bottom of the rod so that the cylinder is perpendicular to the rod. The rod is configured to be grasped in hands of a user, positioning the user to position the cylinder on a fishing line between a fishing pole and a hooked fish. The user is positioned to guide the line away from an obstruction as a fisherman reels in the line with the line sliding over the cylinder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
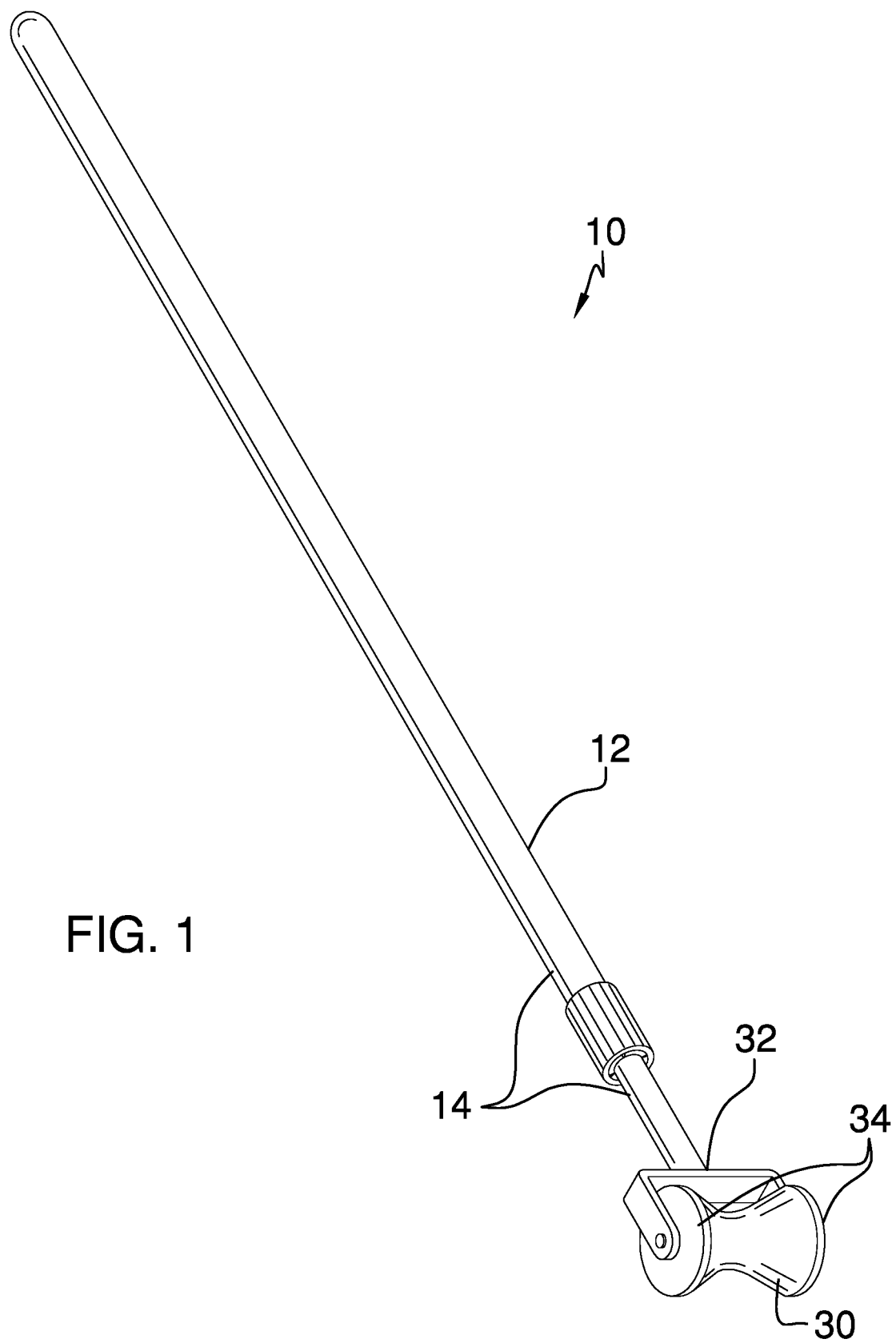
FIG. 1 is an isometric perspective view of a fishing line guide device according to an embodiment of the disclosure.

With reference now to the drawings, and in particular to FIGS. 1 through 4 thereof, a new guide device embodying the principles and concepts of an embodiment of the disclosure and generally designated by the reference numeral 10 will be described.

Figure 2:
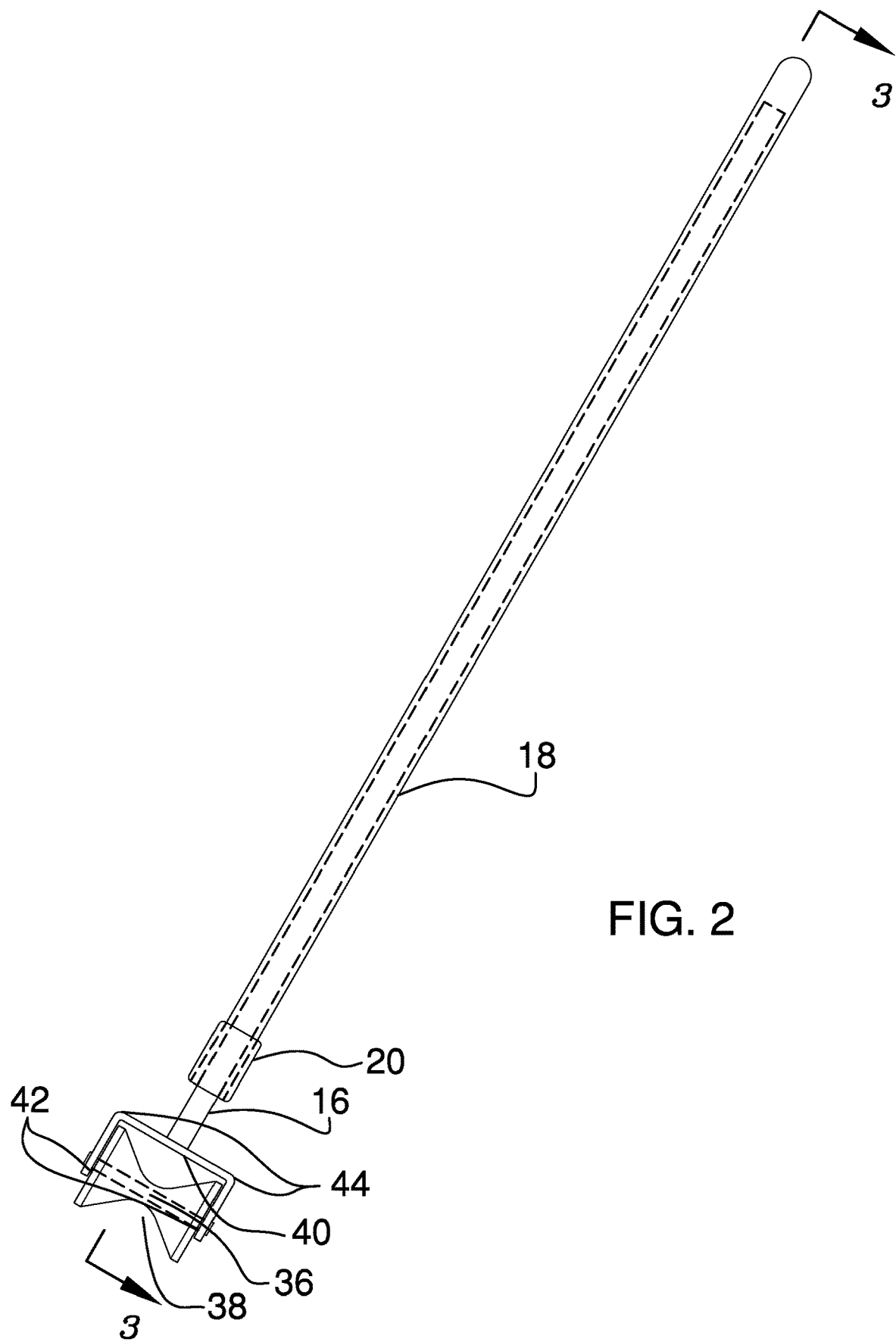
FIG. 2 is a front view of an embodiment of the disclosure.

As best illustrated in FIGS. 1 through 4, the fishing line guide device 10 generally comprises a rod 12. The rod 12 comprises a plurality of nested sections 14 so that the rod 12 is selectively extensible, as shown in FIG. 2. The plurality of nested sections 14 comprises a lower section 16 that is selectively extensible from an upper section 18. The rod 12 is circularly shaped when viewed longitudinally.

Figure 3:
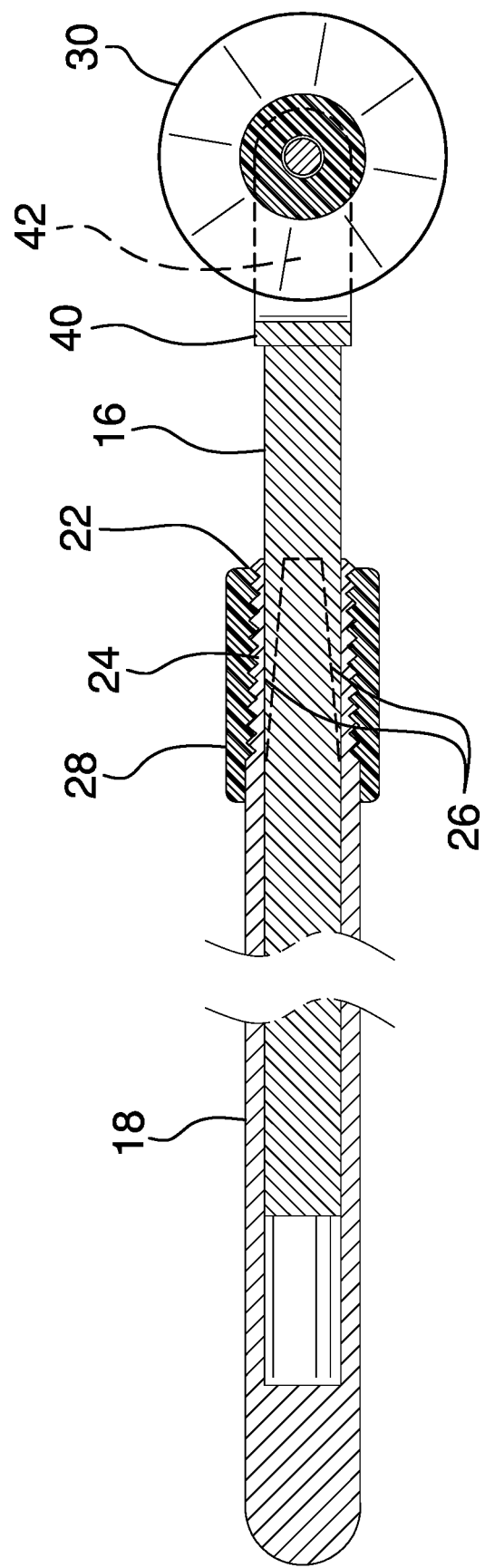
FIG. 3 is a cross-sectional view of an embodiment of the disclosure.
Figure 4:
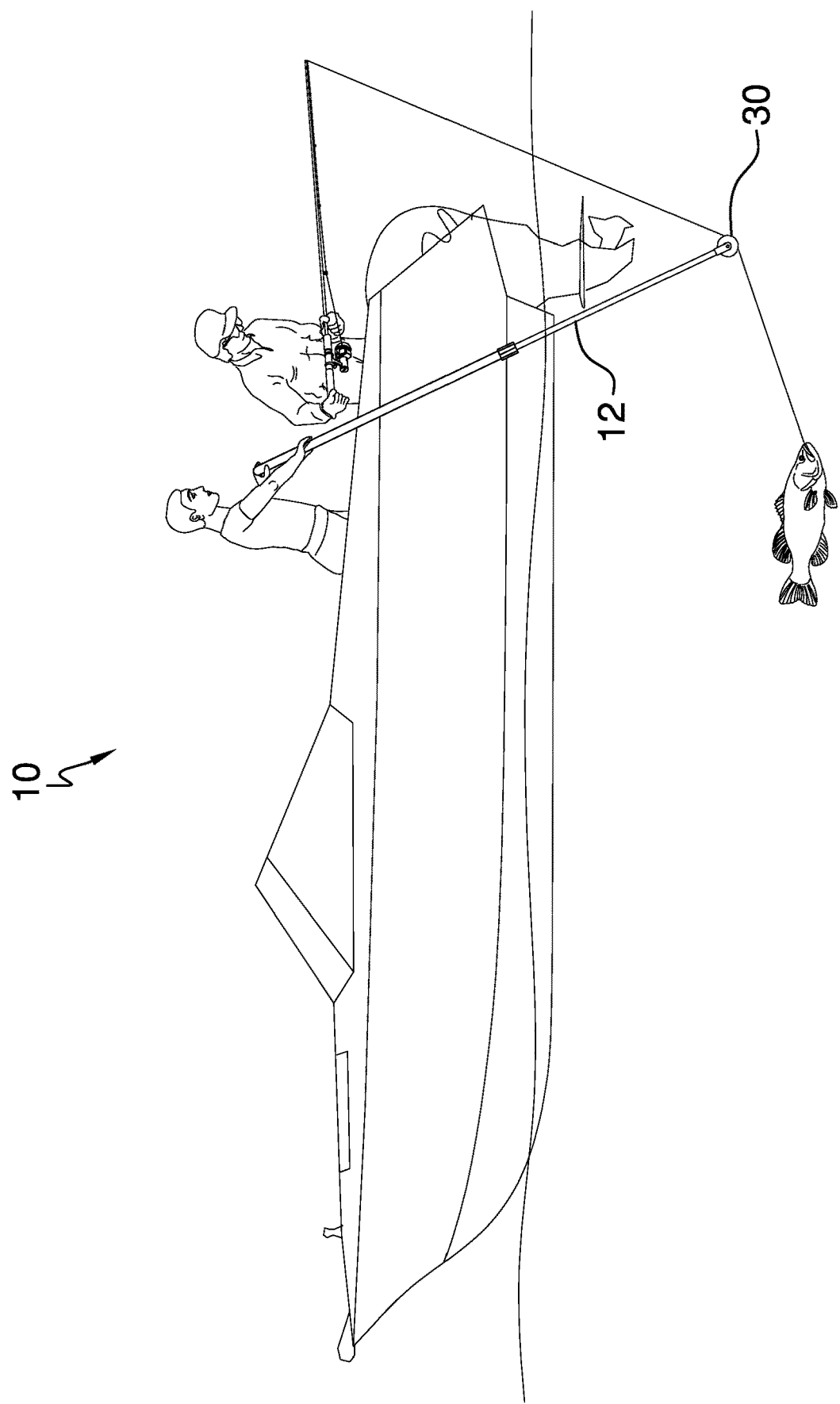
FIG. 4 is an in-use view of an embodiment of the disclosure.

A coupler 20 is coupled proximate to a lower end 22 of the upper section 18. The coupler 20 is selectively couplable to the lower section 16. The lower section 16 is positioned to be selectively slid relative to the upper section 18 positioning the coupler 20 to couple to the lower section 16 to fixedly position the lower section 16 relative to the upper section 18. The coupler 20 comprises a threaded segment 24 that is positioned on the upper section 18 adjacent to the lower end 22, as shown in FIG. 3. The upper section 18 is tapered adjacent to the lower end 22 so that the threaded segment 24 is circumferentially larger distal from the lower end 22.

A plurality of slots 26 extends from the lower end 22 through the threaded section. The plurality of slots 26 comprises two slots 22 that are opposingly positioned in the threaded segment 24. A collar 28 is positioned around the threaded segment 24. The collar 28 is internally threaded so that the collar 28 is complementary to the threaded segment 24. The collar 28 is configured to be selectively rotated relative to the upper section 18 so that the collar 28 is urged along the threaded segment 24. The slots 26 are closed to compress the threaded segment 24 so that the threaded segment 24 frictionally couples to the lower section 16 to fixedly position the lower section 16 relative to the upper section 18.

A cylinder 30 is coupled to a bottom 32 of the rod 12 so that the cylinder 30 is perpendicular to the rod 12. The rod 12 is configured to be grasped in hands of a user, positioning the user to position the cylinder 30 on a fishing line between a fishing pole and a hooked fish. The user is positioned to guide the line away from an obstruction, such as an underside of a boat, submerged log, or a rock, as a fisherman reels in the line with the line sliding over the cylinder 30. The cylinder 30 has opposing endpoints 34. The cylinder 30 tapers from each opposing endpoint 34 to a centerline 36 of the cylinder 30 to define a recess 38. The recess 38 is positioned to insert the line to retain the line in contact with the cylinder 30.

A first bar 40 is coupled to the bottom 32 of the rod 12 and extends bidirectionally from the rod 12, as shown in FIG. 2. Each of a pair of second bars 42 is coupled to and extends perpendicularly from a respective opposing end 44 of the first bar 40. The cylinder 30 is rotationally coupled to and extends between the pair of second bars 42. The cylinder 30 is configured to rotate as the line passes over the cylinder 30.

In use, the user grasps the rod 12 and positions the cylinder 30 against the line between the fishing pole and the hooked fish. The user is positioned to guide the line away from the obstruction as the fisherman reels in the line.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing line guide device comprising:
    a rod; and
    a cylinder coupled to a bottom of the rod such that the cylinder is perpendicular to the rod wherein the rod is configured for grasping in hands of a user positioning the user for positioning the cylinder on a fishing line between a fishing pole and a hooked fish such that the user is positioned for guiding the line away from an obstruction as a fisherman reels in the line with the line sliding over the cylinder, the cylinder having opposing endpoints, the cylinder tapering from each opposing endpoint to a centerline of the cylinder defining a recess wherein the recess is positioned for inserting the line for retaining the line in contact with the cylinder.

2. The device of claim 1, further including the rod comprising a plurality of nested sections such that the rod is selectively extensible.

3. The device of claim 2, further including the plurality of nested sections comprising a lower section selectively extensible from an upper section.

4. The device of claim 3, further including a coupler coupled proximate to a lower end of the upper section, the coupler being selectively couplable to the lower section wherein the lower section is positioned for selectively sliding relative to the upper section positioning the coupler for coupling to the lower section for fixedly positioning the lower section relative to the upper section.

5. The device of claim 4, further including the coupler comprising:
    a threaded segment positioned on the upper section adjacent to the lower end, the upper section being tapered adjacent to the lower end such that the threaded segment is circumferentially larger distal from the lower end;
    a plurality of slots extending from the lower end through the threaded section; and
    a collar positioned around the threaded segment, the collar being internally threaded such that the collar is complementary to the threaded segment wherein the collar is configured for selectively rotating relative to the upper section such that the collar is urged along the threaded segment such that the slots are closed for compressing the threaded segment such that the threaded segment frictionally couples to the lower section for fixedly positioning the lower section relative to the upper section.

6. The device of claim 5, further including the plurality of slots comprising two slots opposingly positioned in the threaded segment.

7. The device of claim 1, further including the rod being circularly shaped when viewed longitudinally.

8. A fishing line guide device comprising:
    a rod;
    a cylinder coupled to a bottom of the rod such that the cylinder is perpendicular to the rod wherein the rod is configured for grasping in hands of a user positioning the user for positioning the cylinder on a fishing line between a fishing pole and a hooked fish such that the user is positioned for guiding the line away from an obstruction as a fisherman reels in the line with the line sliding over the cylinder;
    a first bar coupled to the bottom of the rod and extending bidirectionally from the rod; and
    a pair of second bars, each second bar being coupled to and extending perpendicularly from a respective opposing end of the first bar, the cylinder being rotationally coupled to and extending between the pair of second bars wherein the cylinder is configured for rotating as the line passes over the cylinder.

9. A fishing line guide device comprising:
    a rod, the rod comprising a plurality of nested sections such that the rod is selectively extensible, the rod being circularly shaped when viewed longitudinally, the plurality of nested sections comprising a lower section selectively extensible from an upper section;
    a coupler coupled proximate to a lower end of the upper section, the coupler being selectively couplable to the lower section wherein the lower section is positioned for selectively sliding relative to the upper section positioning the coupler for coupling to the lower section for fixedly positioning the lower section relative to the upper section, the coupler comprising:
        a threaded segment positioned on the upper section adjacent to the lower end, the upper section being tapered adjacent to the lower end such that the threaded segment is circumferentially larger distal from the lower end,
        a plurality of slots extending from the lower end through the threaded section, the plurality of slots comprising two slots opposingly positioned in the threaded segment, and
        a collar positioned around the threaded segment, the collar being internally threaded such that the collar is complementary to the threaded segment wherein the collar is configured for selectively rotating relative to the upper section such that the collar is urged along the threaded segment such that the slots are closed for compressing the threaded segment such that the threaded segment frictionally couples to the lower section for fixedly positioning the lower section relative to the upper section;
    a cylinder coupled to a bottom of the rod such that the cylinder is perpendicular to the rod wherein the rod is configured for grasping in hands of a user positioning the user for positioning the cylinder on a fishing line between a fishing pole and a hooked fish such that the user is positioned for guiding the line away from an obstruction as a fisherman reels in the line with the line sliding over the cylinder, the cylinder having opposing endpoints, the cylinder tapering from each opposing endpoint to a centerline of the cylinder defining a recess wherein the recess is positioned for inserting the line for retaining the line in contact with the cylinder;

a first bar coupled to the bottom of the rod and extending bidirectionally from the rod; and a pair of second bars, each second bar being coupled to and extending perpendicularly from a respective opposing end of the first bar, the cylinder being rotationally coupled to and extending between the pair of second bars wherein the cylinder is configured for rotating as the line passes over the cylinder.

\* \* \* \* \*